United States Patent [19]

Huber

[11] Patent Number: 5,438,906
[45] Date of Patent: Aug. 8, 1995

[54] UNITIZED SHOCK ABSORBING PAD WITH LOOPED FIBER RING

[75] Inventor: Michael S. Huber, Milpitas, Calif.

[73] Assignee: Westinghouse Electric Corporation, Pittsburgh, Pa.

[21] Appl. No.: 640,426

[22] Filed: Aug. 13, 1984

[51] Int. Cl.$^6$ ............................................. F41F 3/052
[52] U.S. Cl. ................... 89/1.816; 89/1.810; 277/152; 277/199
[58] Field of Search .............. 89/1.816, 1.810, 1.819, 89/1.809, 1.8; 277/199, 152, 216

[56] References Cited

U.S. PATENT DOCUMENTS

| | | | |
|---|---|---|---|
| 3,072,022 | 1/1963 | Wood et al. | 89/1.810 X |
| 3,124,040 | 3/1964 | Fiedler | 89/1.816 |
| 3,166,978 | 1/1965 | Price et al. | 89/1.816 |
| 3,289,533 | 12/1966 | Brown | 89/1.810 |
| 3,392,629 | 7/1968 | Soderberg | 89/1.816 |
| 3,499,364 | 3/1970 | D'Ooge | 89/1.810 |
| 3,857,321 | 12/1974 | Cohen | 89/1.810 |
| 4,399,999 | 8/1983 | Wold | 89/1.816 |
| 4,406,211 | 9/1983 | Andersen | 89/1.816 |
| 4,433,848 | 2/1984 | Williams | 89/1.816 X |
| 4,464,972 | 8/1984 | Simon | 89/1.816 |

Primary Examiner—David H. Brown

[57] ABSTRACT

A shock absorbing pad system for a missile in a launch tube comprising a plurality of pads having inner and outer arcuate sheets separated by chevron shaped struts disposed in a circular array and having the inner arcuate sheets joined together by a circumferential tensile resistive fabric which is embedded in the inner arcuate sheets and extends therebetween so as to form a loop in the fabric when the pads are disposed in the launch tube and are in their free state, the loop straightening when the missile is loaded into the tube so that the circular array of pads act as a unit to resist shock and apply centering forces to the missile when it becomes eccentrically disposed in the launch tube.

10 Claims, 5 Drawing Sheets

FIG. 6
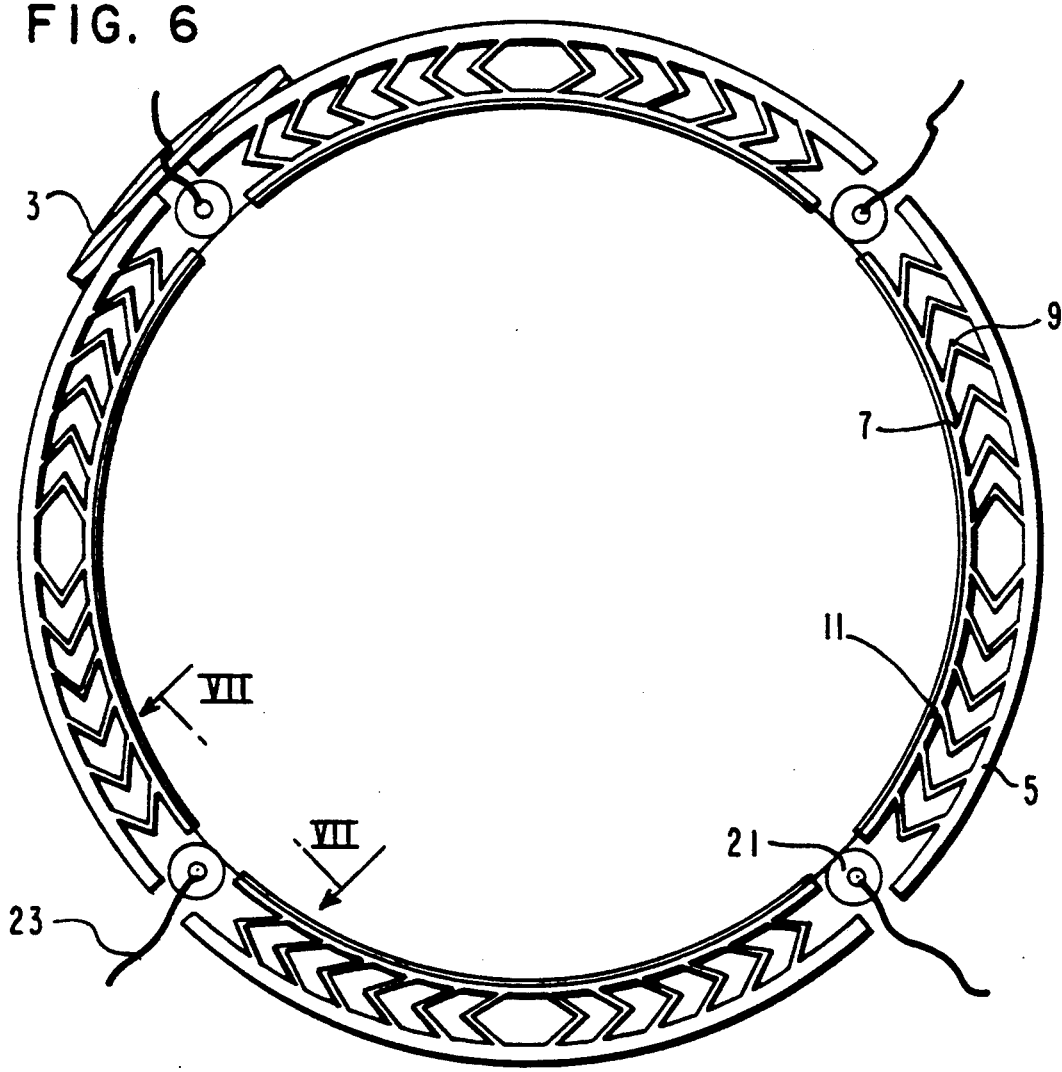
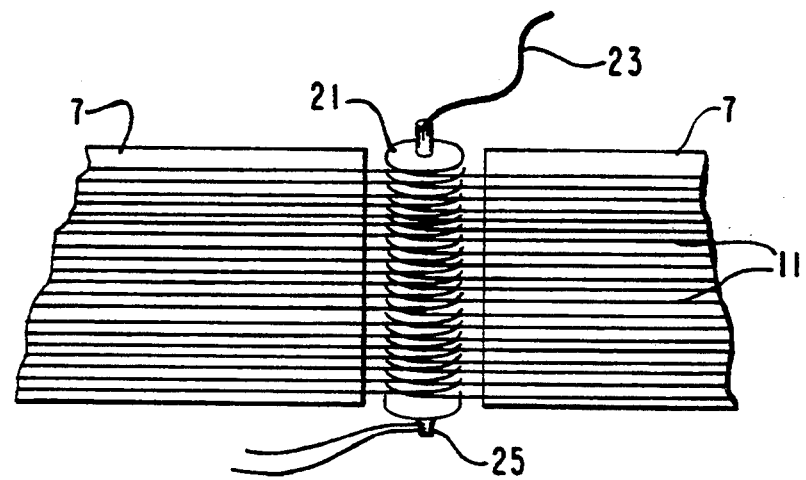
FIG. 7

5,438,906

UNITIZED SHOCK ABSORBING PAD WITH LOOPED FIBER RING

The United States Government has rights in this invention pursuant to Contract No, N0003081C0105 between Westinghouse Electric Corporation and the Department of Defense.

BACKGROUND OF THE INVENTION

This invention relates to shock absorbing pads for missiles disposed in a launch tube and more particularly to such a pad with a looped fiber ring disposed therein.

Shock absorbing pads are installed in missile launch tubes to maintain alignment, mitigate shock and vibration and provide lateral support to the missile during launch. U.S. Pat. No. 4,406,211 describes a similar arrangement with a continuously acting inner sheet and this application is an improvement thereon. It provides for joining the pads in a continuous ring without fasteners between the pad portions, and also provides a means of externally controlling the pad force-deflection characteristics.

SUMMARY OF THE INVENTION

In general, a unitized shock absorbing pad system to be disposed between a launch tube and a missile, when made in accordance with this invention, comprises a first plurality of arcuate sheets which fasten to said launch tube, a second plurality of arcuate sheets spaced annularly from said first plurality of arcuate sheets, axially oriented struts extending between the first and second arcuate sheets, and a fibrous hoop ring extending between and disposed in the second arcuate sheets. The fibrous hoop ring has loops disposed between adjacent arcuate sheets and the loops being sufficiently long to allow a predetermined amount of precompression of said shock absorbing pads when the missile is disposed within the launch tube. In addition, the loops may contain devices for controlling the effective size of the fibrous hoop ring to control the force-deflection characteristic of the unitized pad.

BRIEF DESCRIPTION OF THE DRAWINGS

The objects and advantages of this invention will become more apparent from reading the following detailed description in conjunction with the accompanying drawings, in which:

FIG. 6 is a sectional view of a unitized pad system which shows a controller for controlling the effective hoop size of the fibrous hoop ring; and FIG. 7 is a partial sectional view taken on line VII—VII of FIG. 6.

BRIEF DESCRIPTION OF THE PREFERRED EMBODIMENT

Figure 1:
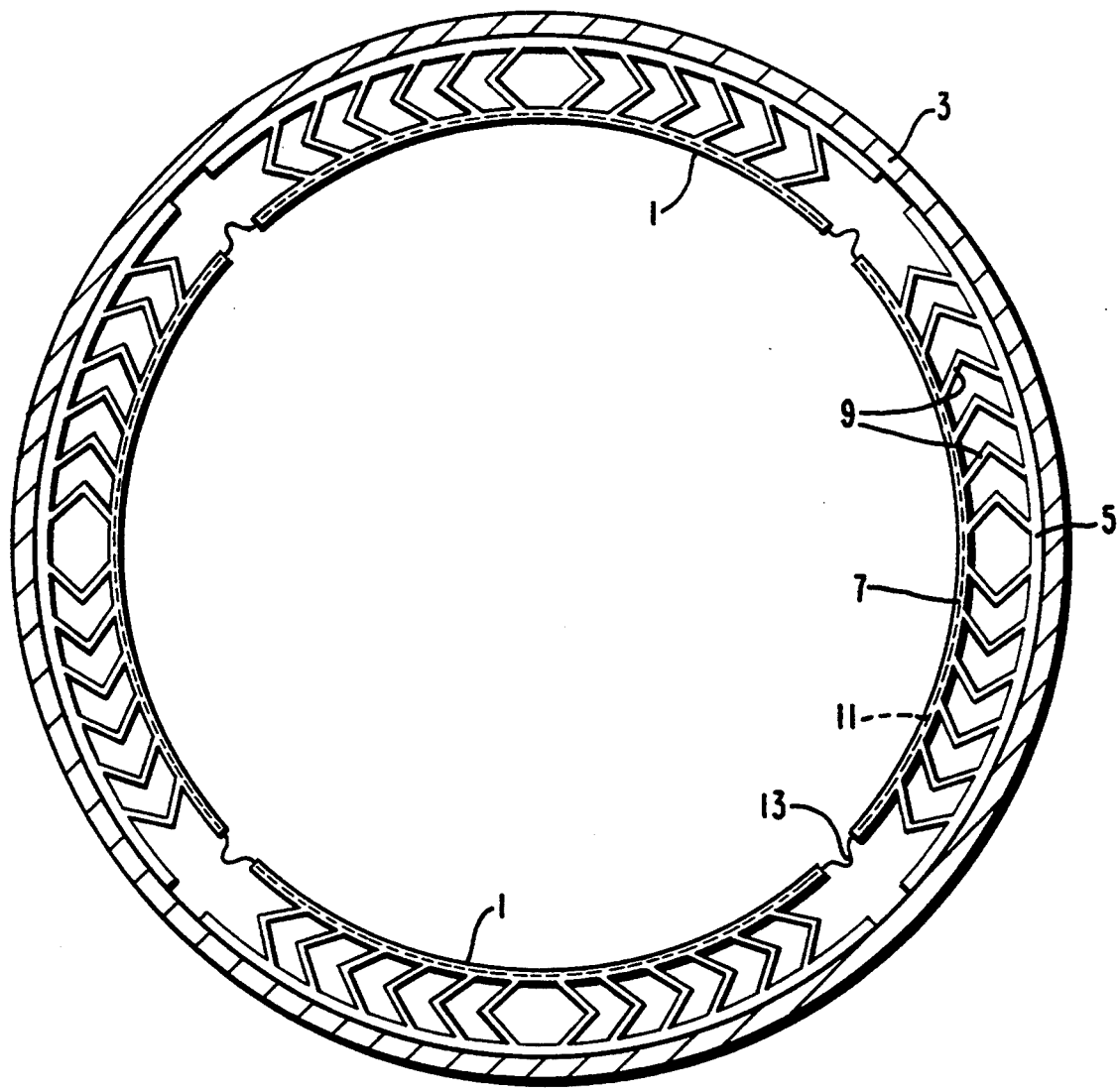
FIG. 1 is a sectional view of a launch tube showing a unitized shock absorbing par system with a looped fiber ring before a missile is loaded into the launch tube.
Figure 2:
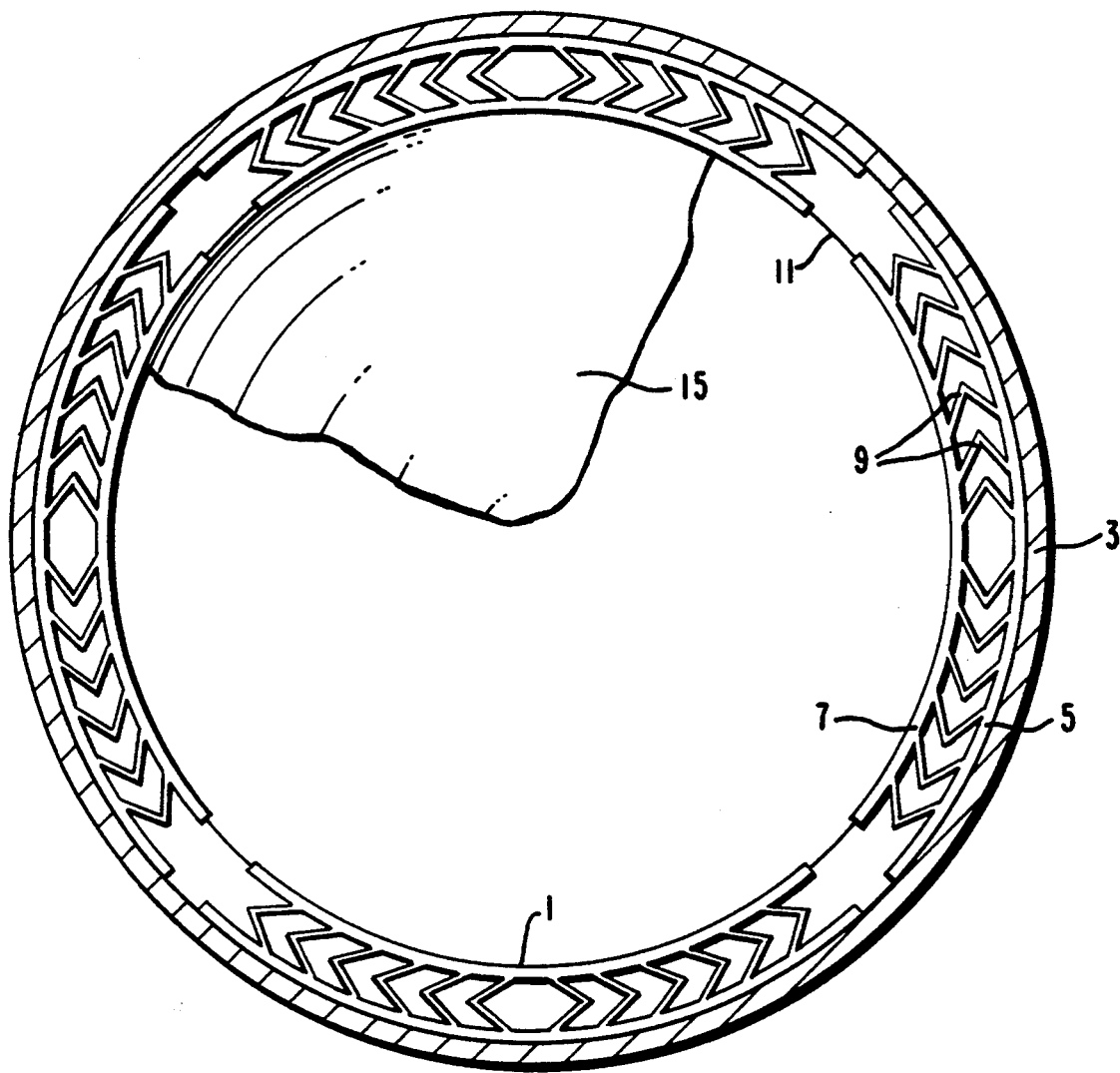
FIG. 2 is a sectional view of a launch tube showing a unitized shock absorbing pad system with a looped fiber ring and the missile disposed in the launch tube.

Referring to the drawings in detail and in particular to FIG. 1 there is shown a circular array of shock absorbing pads I disposed in a launch tube 3. The pads 1 comprise a first arcuate sheet 5 adhesively fastened to the launch tube 3 and a second arcuate sheet 7 spaced annularly with respect to the first arcuate sheet 5 and a plurality of geometrically shaped struts 9 extending between the sheets 5 and 7. The struts 9 are preferably chevron shaped and divided into two groups in each pad. One group is disposed with the chevrons facing one direction and the other group is disposed with the chevrons facing the opposite direction. Disposed within the second arcuate sheet 7 of each of the pads which are disposed in a circular array is a circumferential tensile member 11, preferably made of a circumferential unidirectional fabric which links the second arcuate sheets 7 into a unitized structure. The circumferential tensile member 11 between adjacent arcuate sheets 7 is greater in length than the spacing between the arcuate sheets 7 and in its free state forms a loop 13, which, depending on the desired force-deflection characteristics, is partially or fully stretched out when a missile 15 is disposed in the launch tube 3 as shown in FIG. 2. FIGS. 1 through 5 show a fibrous tension member 11 with a minimum size loop.

Figure 5:
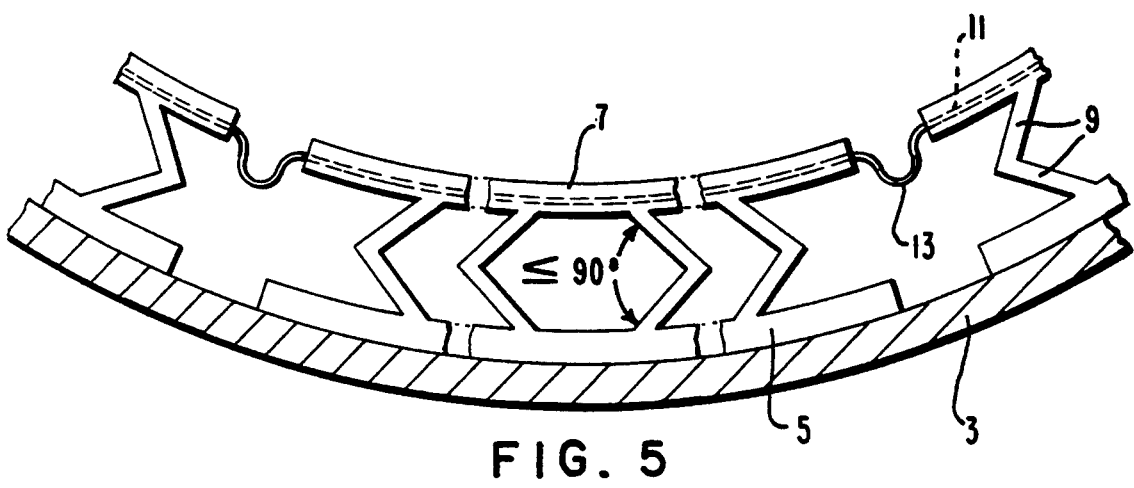
FIG. 5 is an enlarged sectional view of a portion of the pads made in accordance with this invention.

FIG. 5 shows that the chevron shaped struts have an included angle generally 90° or less and that the distance between adjacent struts is generally greater than ½ of the length of the length of both legs of the chevron or the distance between the arcuate sheets following the chevron.

Figure 4:
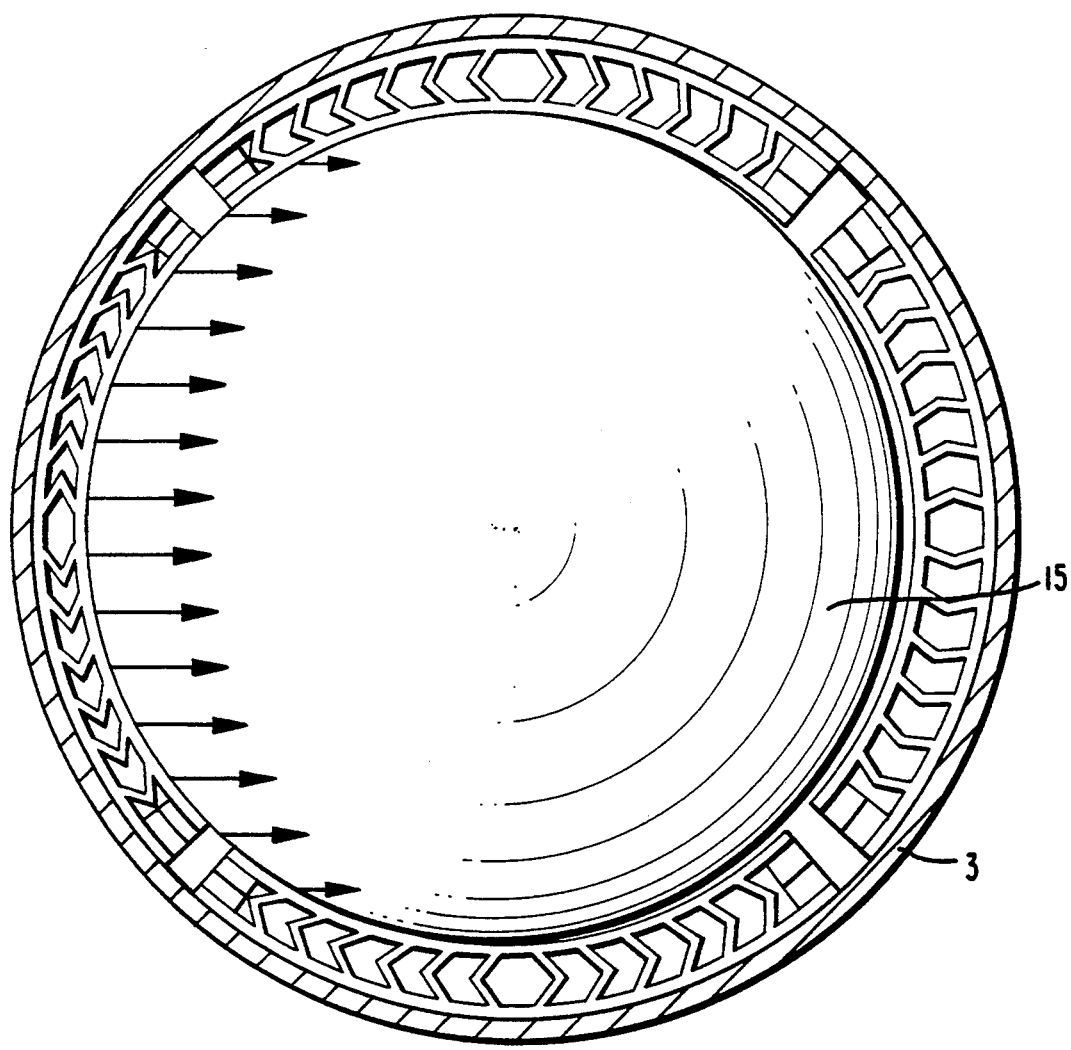
FIG. 4 is a sectional view of a launch tube showing the restoration force of a prior art pad system on a missile eccentrically disposed in the launch tube.

FIG. 4 shows the centering force applied to the missile 15 when it is eccentrically disposed in the launch tube 3 when prior art shock absorbing pads are utilized. The arrows represent the direction and relative magnitudes of the centering force.

Figure 3:
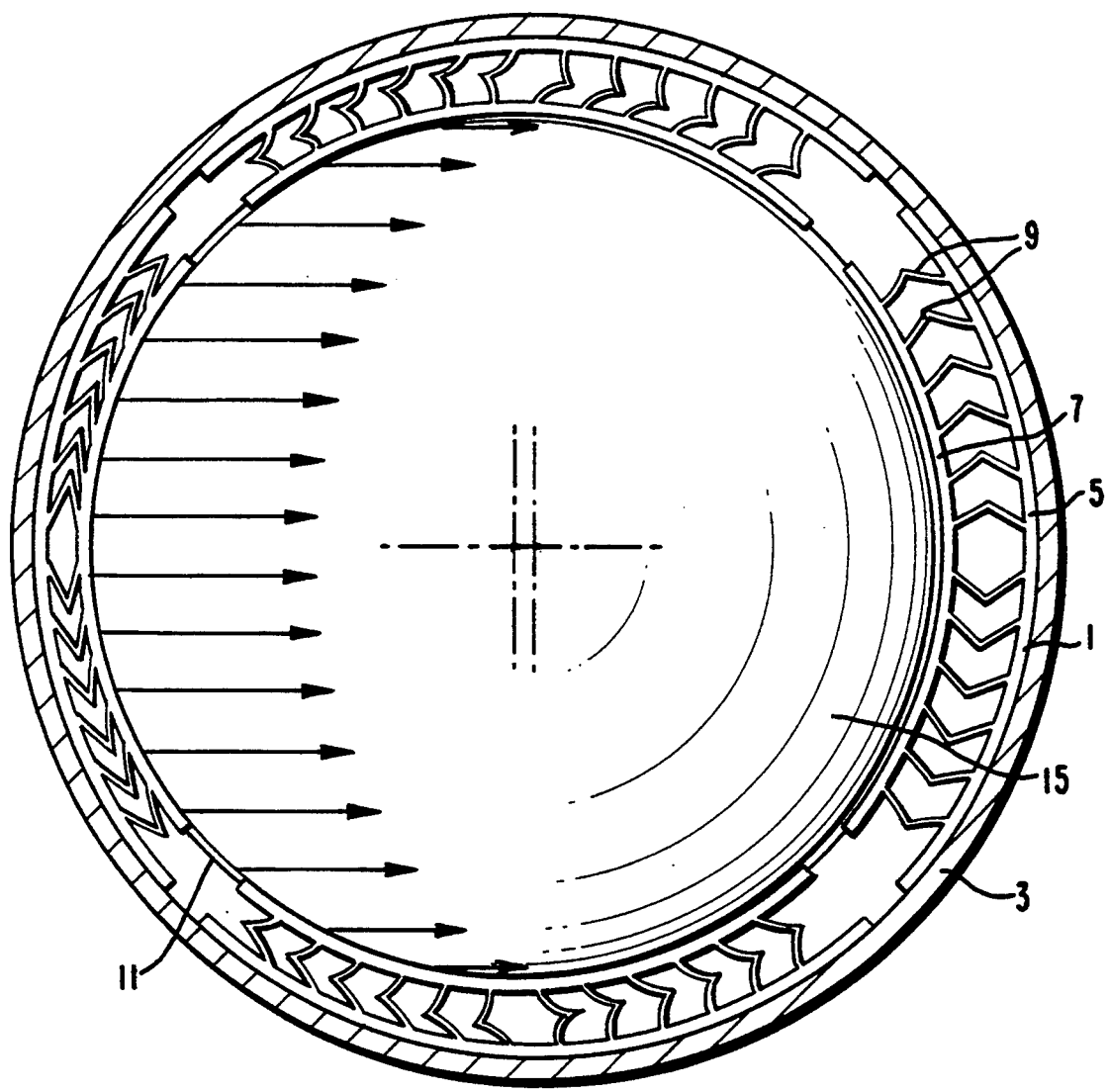
FIG. 3 is a sectional view of a launch tube showing the restoration force applied by the unitized pad system to the missile eccentrically disposed in the launch tube.

FIG. 3 shows the centering force applied to the missile 15 when it is eccentrically disposed in a launch tube equipped with shock absorbing pads 1 made in accordance with this invention. The arrows indicate the direction and relative magnitude of the centering force. It should be noted that the magnitude of the centering force is greater than shown in FIG. 4 primarily because the arc of effective restoring force extends over a larger portion of the missile due to the unitizing effect of the tensile resistant fabric.

The shock absorbing pads 1 with a continuous circumferential tension member 11 advantageously provides more even distribution of the restoring force to the skin of the missile 15, allows the pads to have thinner components so that the collapse height is smaller, allows the pads to be made with less free height, which results in less precompression of the pads when a missile is disposed therein. The loops 13 allow the necessary precompression of the pads and also allow the use of a circumferential reinforcement material with very little elasticity.

The use of a high modulus circumferential reinforcement material has several advantages. One of them is that the deformed shape of the lateral support system is relatively insensitive to the rate at which lateral offset occurs. This is important because a low modulus material of the pad units joined with fasteners as disclosed in U.S. Pat. No. 4,406,211 adds its own dynamic to static ratio to the ratios created by the strut material and geometry and this considerably complicates shock analysis. Another advantage of the high modulus circumferential reinforcement is that it will reduce or eliminate the pad collapse or flattening, which sometimes occurs when the prior art pads are subjected to launch pressure. Elimination of pad collapse helps maintain a centering force on the trailing end of the missile during launch.

The most important advantage of the high modulus circumferential reinforcement is that it maintains the amount of unitization around the circumference of the pad row, thus insuring that all of the struts contribute to the centering force acting upon the missile. A low modulus material disadvantageously allows the hoop ring to stretch, thus increasing the effective hoop size and reducing the amount of unitization.

FIGS. 6 and 7 show a controller for controlling the effective size of the hoop wherein the fibers 11 of the hoop ring wrap once around an expandable tube or bladder 21. A pressurized fluid is supplied to the bladder via a conduit 23 to expand it a predetermined radial amount externally controlling the effective hoop size and the force-deflection characteristic of the unitized pad. A variable relief check-valve 25 controlled electrically or by other means may also be employed to control the break-out tension of the unitized pad by getting or varying the maximum pressure within the bladder 21 and maximum tension in the fibrous ring.

What is claimed is:

1. A shock absorbing system to be disposed between a launch tube and a missile said shock absorbing system comprising:
    a first plurality of arcuate sheets which fasten to said launch tube;
    a second plurality of arcuate sheets spaced annularly from said first plurality of arcuate sheets;
    geometrically shaped struts extending between said first and second arcuate sheets;
    a fibrous ring extending between and disposed in said second arcuate sheets;
    said fibrous ring having loops disposed between adjacent second arcuate; and
    said loop being sufficiently long to provide a predetermined amount of preloading of said shock absorbing pads when they are disposed in an arcuate array in the launch tube, 2. A shock absorbing pad as set forth in claim 1, and further comprising an expandable member disposed between said second arcuate sheets and said loop wrapping around said expandable member for controlling the effective size of said fibrous ring to vary the force-deflection characteristic of said pad.

3. A shock absorbing system as set forth in claim 1, wherein the geometrically shaped struts are chevron shaped.

4. A shock absorbing system as set forth in claim 3, wherein the included angle of the chevron shaped struts is generally 90° or less.

5. A shock absorbing pad system as set forth in claim 4, wherein the spacing between the chevron shaped struts is generally greater than ½ of the total length of the chevron shaped strut.

6. A shock absorbing pad system as set forth in claim 4, wherein the chevron shaped struts between the annularly spaced sheets are disposed in two groups wherein the chevron shaped struts in each group face the same direction and the chevron shaped struts in one group face the opposite direction with respect to the chevron shaped struts of the other group.

7. A shock absorbing pad as set forth in claim 1 and further comprising a plurality of expandable members disposed between said second arcuate sheets and said loops wrapping around said expandable member for controlling the effective size of said fibrous ring to vary the force-deflection characteristic of said pad.

8. A shock absorbing pad as set forth in claim 7 and further comprising means for supplying pressurized fluid to said expandable member at a predetermined pressure for controlling the effective size of said fibrous ring to set the force deflection characteristic of said pad.

9. A shock absorbing pad as set forth in claim 8 and further comprising pressure relief means in fluid communication with said expandable member for setting the maximum tension in said fibrous ring.

10. A shock absorbing pad as set forth in claim 9 and further comprising means for remotely varying the relief pressure of the pressure relief means.

* * * * *